United States Patent [19]

Percell

[11] Patent Number: 4,639,484

[45] Date of Patent: Jan. 27, 1987

[54] MOLD RELEASE ENHANCEMENT FOR ACRYLONITRILE-BUTADIENE-STYRENE MOLDING RESINS

[75] Inventor: Kim S. Percell, Memphis, Tenn.

[73] Assignee: Witco Chemical Corporation, New York, N.Y.

[21] Appl. No.: 843,719

[22] Filed: Mar. 25, 1986

[51] Int. Cl.⁴ .............................................. C08J 3/10
[52] U.S. Cl. ..................................... 524/318; 524/504
[58] Field of Search ................................ 524/318, 504

[56] References Cited

U.S. PATENT DOCUMENTS

| | | |
|---|---|---|
| 2,939,898 | 6/1960 | Aron . |
| 3,008,908 | 11/1961 | Voigt . |
| 3,406,136 | 10/1968 | Scarso et al. ......................... 524/318 |
| 3,591,546 | 7/1971 | Christmas et al. ................... 524/318 |
| 3,784,595 | 1/1974 | Schirmer et al. .................... 524/611 |
| 3,836,499 | 9/1974 | Schirmer et al. .................... 524/315 |
| 4,012,357 | 3/1977 | Foulks, Jr. et al. ................. 524/312 |
| 4,097,435 | 6/1978 | Rawlings et al. .................... 524/277 |
| 4,174,325 | 11/1979 | Pischtschan et al. ............... 524/318 |
| 4,363,891 | 12/1982 | Rosen et al. ......................... 524/567 |
| 4,395,509 | 7/1983 | Blackwell et al. .................. 524/318 |
| 4,408,000 | 10/1983 | Lee ...................................... 524/318 |
| 4,409,351 | 10/1983 | Lee ...................................... 524/609 |
| 4,419,478 | 12/1983 | Brandstetter et al. ............. 524/318 |
| 4,446,268 | 5/1984 | Lee ...................................... 524/315 |

*Primary Examiner*—Herbert J. Lilling
*Attorney, Agent, or Firm*—Lockwood, Alex, Fitzgibbon & Cummings

[57] ABSTRACT

Thermoplastic molding compositions are provided which include acrylonitrile-butadiene-styrene resin in combination with a mold release agent ester that is a wax ester including cetyl palmitate, cetyl stearate and blends of cetyl palmitate and cetyl stearate. Also provided is a method for reducing the release force needed to remove injection molded acrylonitrile-butadiene-styrene parts from the mold by incorporating the mold release agent ester into the thermoplastic molding composition.

18 Claims, No Drawings

MOLD RELEASE ENHANCEMENT FOR ACRYLONITRILE-BUTADIENE-STYRENE MOLDING RESINS

BACKGROUND AND DESCRIPTION OF THE INVENTION

The present invention generally relates to molding compositions and to the use of particular wax esters in reducing the force needed to release a molded thermoplastic resin from an injection mold or the like. More particularly, the thermoplastic molding composition includes a thermoplastic acrylonitrile-butadiene-styrene resin and a cetyl ester mold release agent, as well as the use of a cetyl ester mold release agent in a method for reducing the mold release force required for removing a molded thermoplastic acrylonitrile-butadiene-styrene polymer from an injection molding unit. By proceeding in accordance with this invention, the mold release force is reduced by approximately 10 percent or more, such force reduction being accomplished without needing to add free carboxylic acid to the molding resin composition, the invention avoids any significant deterioration of the mechanical properties of the molded acrylonitrile-butadiene-styrene, and same does not cause any change in the appearance thereof.

Lubricants are conventionally employed in the processing of generally rigid plastic materials such as acrylonitrile-butadiene-styrene resins or polymers in order to improve the processability of the resin or polymer. It has been found that incorporating such lubricants into these generally rigid molding resins or polymers results in an improvement in the mold release properties of these resinous or polymeric products when they are injection molded. Known lubricants, especially in connection with the molding of polycarbonate molding compositions, include various carboxylic acids and esters. Mold release enhancement has been well developed, and numerous lubricant components are available and suitable for reducing the mold release force required for polycarbonate molding compositions, as well as other resin and polymer molding compositions.

When the resin or polymer of the injection molding composition is an acrylonitrile-butadiene-styrene thermoplastic material, problems are frequently encountered due to the force required when removing the molded part from the injection molding unit. While various lubricants have been proposed and utilized in an effort to reduce the mold release force required in this regard, the incorporation of such lubricants brings with it the concern that the molded acrylonitrile-butadiene-styrene products will exhibit significant losses with respect to the mechanical properties of the molded resin or polymer, as well as an undesirable change in appearance of the molded part made from a lubricated composition when compared with one made from an unlubricated one. Also, many lubricating-type additives are not especially effective in enhancing the ease of mold release of acrylonitrile-butadiene-styrene parts to any substantial extent.

Some lubricants that are suitable for enhancing the mold release properties of rigid resins or polymers such as polycarbonate are not particularly suitable or useful in achieving mold release enhancement properties when those same lubricants are used in conjunction with the molding of acrylonitrile-butadiene-styrene resins or polymers. Other lubricants may cause serious deterioration of mechanical properties and/or of the physical appearance of molded acrylonitrile-butadiene-styrene molding compositions, thereby making them less than satisfactory despite their effectiveness in reducing the force needed to push the shaped plastic piece out of the mold.

Accordingly, there is a need for a mold release composition and method for improving the mold release properties of acrylonitrile-butadiene-styrene injection molding compositions while at the same time minimizing or substantially eliminating any deterioration in the physical properties of the molded part and without detracting from or otherwise changing the appearance of the molded part in comparison to the physical properties and appearance of acrylonitrile-butadiene-styrene parts that are molded without the aid of lubricants or mold release agents. It would also be desirable to provide a mold release enhancement method and composition that is not complex and that is realized by the addition of but a single component to the acrylonitrile-butadiene-styrene component.

By the present invention, a thermoplastic molding composition is provided which exhibits mold release properties that include a significant reduction in the force required to remove parts molded therefrom from injection molding devices, which thermoplastic molding composition does not exhibit a significant deterioration of physical properties or change in appearance from the physical properties and appearance of acrylonitrile-butadiene-styrene resins that are not modified with a lubricant or mold release agent or the like. Included in accordance with the present invention is the addition of a cetyl ester component to an acrylonitrile-butadiene-styrene resin in mold release effective amounts and molding same, typically in accordance with injection molding techniques, followed by ejecting same from the mold with reduced mold release forces in order to provide a finished acrylonitrile-butadiene-styrene part that has substantially the same physical properties and appearance as substantially unmodified acrylonitrile-butadiene-styrene polymer parts.

It is accordingly a general object of the present invention to provide an improved thermoplastic molding composition and method of enhancing the mold release attributes of the resin.

Another object of the present invention is to provide an improved thermoplastic acrylonitrile-butadiene-styrene molding composition that includes a mold release agent which significantly reduces mold release forces without substantially affecting the physical properties of the molded product.

Another object of this invention is to provide a method for improving the mold release properties of an acrylonitrile-butadiene-styrene product without seriously deteriorating the physical properties of the molded product and without perceptibly modifying the appearance of the molded product.

Another object of this invention is to utilize certain wax esters as lubricant components in an acrylonitrile-butadiene-styrene molding composition and method.

Another object of the present invention is to provide an improved molding composition and method for acrylonitrile-butadiene-styrene molding which does not require and which can preclude the use of free carboxylic acids within the molding composition.

These and other objects, features and advantages of the present invention will be clearly understood through a consideration of the following detailed description.

DESCRIPTION OF THE PARTICULAR EMBODIMENTS

The thermoplastic molding compositions according to the invention include certain wax esters or wax ester mixtures blended with an acrylonitrile-butadiene-styrene resin in an amount that is effective to enhance the mold release properties of the blended composition when compared with acrylonitrile-butadiene-styrene molding compositions incorporating other lubricants or the like. There is no need to add any free carboxylic acid to the molding composition.

By proceeding with such addition of wax ester to the acrylonitrile-butadiene-styrene resin, it is possible to proceed with the method of use according to this invention, by which the mold release force that is required for removing articles or parts molded with this composition from an injection mold or the like is significantly reduced. The wax ester is put to use as an agent in a mold release force reduction method. In the method, the wax ester is added to the acrylonitrile-butadiene-styrene resin to form a thermoplastic molding composition. This composition is inserted into an injection molding device and is molded into a shaped product, which shaped product is released from the mold by applying a mold release force that is less than that needed for removing the acrylonitrile-butadiene-styrene molded resin or polymer from the injection mold.

The wax ester mold release agents according to this invention are cetyl palmitate, cetyl stearate, and blends of cetyl palmitate and cetyl stearate. Typically, these esters are readily made by reacting cetyl alcohol with palmitic acid, stearic acid, and most typically with a blend of palmitic acid and stearic acid. The cetyl alcohol is a linear, saturated, primary alcohol having 16 carbon atoms. The palmic and stearic acids are saturated, linear fatty acids having 16 and 18 carbon atoms, respectively. Exemplary palmitic acid and stearic acid blends are generally available in blends of between about 50 weight percent and about 90 and above weight percent of one of the acids, the remainder being predominantly the other acid.

The concentrations at which these wax ester mold release agents are added to the acrylonitrile-butadiene-styrene resin are in amounts that are effective to achieve the enhanced mold-releasability that is desired. Typically, such amounts will range between about 0.1 weight percent and about 2 weight percent, based on the total weight of the acrylonitrile-butadiene-styrene resin. The preferred concentration range for the wax ester mold release agent is between about 0.4 weight percent and about 1.5 weight percent, most preferably between about 0.5 weight percent and about 1.2 weight percent based on the total weight of the acrylonitrile-butadiene-styrene resin.

When these wax ester mold release agents are utilized at these mold release effective amounts, the amount of force that is needed to push or eject the injection molded plastic products, pieces or parts out of the injection mold are reduced by at least about 10 percent, which is a considerably greater reduction than those imparted by other esters or numerous carboxylic acids and other known mold release agents. These levels of reduced mold release force are achieved when the wax esters according to the invention are incorporated into acrylonitrile-butadiene-styrene thermoplastic resin molding compositions. The method is especially suitable for enhancing the external lubricity of acrylonitrile-butadiene-styrene resin molding compositions by reducing the frictional forces that develop between the outside surface of the molded acrylonitrile-butadiene-styrene part and the surfaces of the injection mold cavity within which the part was formed. The method will also improve the internal lubricity of the molten acrylonitrile-butadiene-styrene resin molding composition while same flows during the molding operation.

EXAMPLE 1

Various additives were incorporated into acrylonitrile-butadiene-styrene resin molding compositions. Each composition was injection molded and the force needed to push the molded piece out of the injection mold was measured and was compared with the mold release force needed for an acrylonitrile-butadiene-styrene resin into which no additive was incorporated. In each case, the additive was blended into the composition at a level of 1.0 weight percent, based upon the total weight of the resin, each additive having been incorporated into the resin in an extruder so that the additive was evenly distributed within the acrylonitrile-butadiene-styrene resin. All injection molding operations were carried out in the same manner.

The mold release force required for each additive-containing composition was compared with the mold release force needed for the control acrylonitrile-butadiene-styrene composition, the results being reported in Table I, from which it can be seen that many of the additives were not very effective mold release agents, this being especially true for the carboxylic acid addition products, the amine and amide addition products, and the esters that are not classifiable as wax esters. Only cetyl palmitate, cetyl stearate and a roughly 50/50 blend of cetyl palmitate and cetyl stearate achieved a reduction of mold release force of at least 10 percent.

TABLE I

| Additive | Percent Reduction of Mold Release Force |
| --- | --- |
| Cetyl Palmitate | 11.2 |
| Cetyl Stearate | 11.4 |
| Cetyl Palmitate-Stearate | 10.4 |
| Cetyl Myristate | 7.6 |
| Myristyl Myristate | 9.1 |
| Myristyl Palmitate | 8.7 |
| Myristyl Stearate | 7.2 |
| Stearyl Palmitate | 7.1 |
| Stearyl Stearate | 7.4 |
| Stearyl Behenate | 7.2 |
| Stearic Acid | 1.2 |
| Oleic Acid | −1.7 |
| Stearyl Amine | 0.6 |
| Erucamide | 1.6 |
| Stearamide | 1.3 |
| N,N'—ethylenebisoleamide | 4.8 |
| Methyl Stearate | 2.0 |
| Behenyl Erucate | 1.9 |
| ABS (Control) | 0 |

EXAMPLE 2

Testing was carried out in order to evaluate certain physical properties of particular acrylonitrile-butadiene-styrene resin molding compositions according to the invention when compared with acrylonitrile-butadiene-styrene resin molding compositions that did not contain any release agent. More particularly, three different compositions according to this invention were injection molded under the same conditions at which an injection molding run was made with an acrylonitrile-butadiene-styrene thermoplastic molding composition having no additive. Runs were made at additive levels of 0, 0.25, 0.50 and 1.0 weight percent, based on the weight of the acrylonitrile-butadiene-styrene resin. The results are reported in Table II, from which data it is concluded that use of the mold release agents in accordance with the present invention does not cause serious deterioration of mechanical properties. The Izod impact strength increased slightly with the addition of the additive, with such increase being more evident at the higher additive concentrations. The tensile strength at yield and at break, as well as the percent elongation at break, decreased somewhat, but the decreases indicated by the data are not significant. Also, the appearance of the molded piece after release was the same in each instance as the appearance of the pieces that were molded from the compositions that did not include the additives in accordance with the present invention, there being no evidence of darkening of polymer color or of powdery residue on the surfaces of the molded parts.

TABLE II

| Test | Weight Percent of Additive | | | |
|---|---|---|---|---|
| | 0 | 0.25 | 0.50 | 1.0 |
| Cetyl Palmitate | | | | |
| Tensile strength at yield, psi | 7171 | 6624 | 6422 | 6234 |
| Tensile strength at break, psi | 5608 | 5651 | 5501 | 5619 |
| Percent elongation at break | 3.95 | 3.70 | 3.28 | 3.10 |
| Izod impact, ft-lbs/in | 3.99 | 3.99 | 4.12 | 4.30 |
| Cetyl Stearate | | | | |
| Tensile strength at yield, psi | 7172 | 6714 | 6461 | 6170 |
| Tensile strength at break, psi | 5608 | 5558 | 5475 | 5347 |
| Percent elongation at break | 3.95 | 3.96 | 3.38 | 2.68 |
| Izod impact, ft-lbs/in | 3.99 | 4.08 | 4.14 | 4.47 |
| Cetyl Palmitate - Cetyl Stearate Blend | | | | |
| Tensile strength at yield, psi | 7172 | 6752 | 6426 | 6221 |
| Tensile strength at break, psi | 5608 | 5686 | 5520 | 5389 |
| Percent elongation at break | 3.95 | 3.98 | 3.06 | 2.83 |
| Izod impact, ft-lbs/in | 3.99 | 4.14 | 4.27 | 4.60 |

EXAMPLE 3

Tests were run in order to assess the effect, if any, on the mold release properties of acrylonitrile-butadiene-styrene compositions when a fatty acid is included within a molding composition that also includes a mold release agent in accordance with the present invention.

In one group of tests, four different molding compositions were formed. Each included acrylonitrile-butadiene-styrene resin and 1 percent, based upon the weight of the resin, of a wax ester mold release agent that is a blend of approximately 90 weight percent cetyl palmitate and approximately 10 weight percent cetyl stearate. This ester blend was analyzed as having an acid number of 0.6, from which it was determined that such composition included 30 ppm of free fatty acid due to residual acid remaining after formation of the ester, such residual acid being primarily palmitic acid with some stearic acid. One run of this composition (identified as Composition A) indicated a reduction of mold release force of 11.2 percent, while another run (Composition B) indicated a mold release force reduction of 11.5 percent. Another run was made with a composition (Composition C) to which fatty acid (approximately 90 weight percent palmitic acid and approximately 10 weight percent stearic acid) was added to the molding composition just described until the free fatty acid was at a level totalling 350 ppm. When this composition was injection molded, the percent reduction of mold release force was measured as 11.3 percent. Another run was made from a composition (Composition D) which was formulated in substantially the same manner as Composition C, except the total concentration of free fatty acids was 700 ppm. Composition D tested as having a mold release force reduction of 11.2 percent. These data indicate that the presence of free fatty acid at levels of up to 700 ppm (0.07 weight percent based upon the weight of the resin) provides no enhancement of mold release force reduction.

Compositions were also formulated that were similar to compositions A, B, C and D, except this time the mold release agent in accordance with this invention was a blend of approximately 50 weight percent cetyl palmitate and approximately 50 weight percent cetyl stearate. This ester blend was found to have an acid number of 2.7, and it was determined that Composition E included 135 ppm of residual fatty acid that was approximately 50 weight percent palmitic acid and approximately 50 weight percent stearic acid. The percent reduction of mold release force was measured as 10.9 percent. Composition F was substantially the same as Composition E, and the measured mold release force reduction was 11.3 percent. Composition G had free fatty acid (approximately 50 weight percent palmitic acid and approximately 50 weight percent stearic acid) added thereto in order to form a composition having a total of 350 ppm of free fatty acid. Composition G was measured as having a mold release force reduction of 11.6 percent. Composition H had free fatty acid (approximately 50 weight percent palmitic acid and approximately 50 weight percent stearic acid) added thereto in order to form a composition having a total of 700 ppm of free fatty acid. Composition G was measured as having a mold release force reduction of 11.2 percent. These results further indicate that the presence of free fatty acid at levels up to 700 ppm does not, within the limits of experimental error, have any effect on mold release reduction.

It will be understood that the embodiments of the present invention which have been described are illustrative of some of the applications of the principles of the present invention. Numerous modifications made be made by those skilled in the art without departing from the true spirit and scope of the invention.

I claim:

1. A thermoplastic molding composition, comprising a thermoplastic acrylonitrile-butadiene-styrene resin and a mold release force reduction effective amount of a mold release agent ester selected from the group consisting of cetyl palmitate, cetyl stearate and blends of cetyl palmitate and cetyl stearate.

2. The thermoplastic molding composition according to claim 1, wherein said mold release force reduction effective amount is between about 0.1 and about 2 weight percent of the composition, based on the weight of the acrylonitrile-butadiene-styrene resin.

3. The thermoplastic molding composition according to claim 1, wherein said mold release force reduction effective amount is between about 0.4 and about 1.5 weight percent of the composition, based on the weight of the acrylonitrile-butadiene-styrene resin.

4. The thermoplastic molding composition according to claim 1, wherein said mold release force reduction effective amount is between about 0.5 and about 1.2 weight percent of the composition, based on the weight of the acrylonitrile-butadiene-styrene resin.

5. The thermoplastic molding composition according to claim 1, wherein said composition excludes added free carboxylic acid that is in addition to any free carboxylic acid present as residual acid left unreacted after esterification of said mold release agent ester.

6. The thermoplastic molding composition according to claim 1, wherein the molded composition exhibits a mold release force reduction of at least about 10 percent.

7. A thermoplastic molding composition, consisting essentially of a thermoplastic acrylonitrile-butadiene-styrene resin and a mold release force reduction effective amount of a mold release agent ester selected from the group consisting of cetyl palmitate, cetyl stearate and blends of cetyl palmitate and cetyl stearate.

8. The thermoplastic molding composition according to claim 7, wherein said mold release force reduction effective amount is between about 0.1 and about 2 weight percent of the composition, based on the weight of the acrylonitrile-butadiene-styrene resin.

9. The thermoplastic molding composition according to claim 7, wherein said mold release force reduction effective amount is between about 0.4 and about 1.5 weight percent of the composition, based on the weight of the acrylonitrile-butadiene-styrene resin.

10. The thermoplastic molding composition according to claim 7, wherein said mold release force reduction effective amount is between about 0.5 and about 1.2 weight percent of the composition, based on the weight of the acrylonitrile-butadiene-styrene resin.

11. The thermoplastic molding composition according to claim 7, wherein the molded composition exhibits a mold release force reduction of at least about 10 percent.

12. A method for reducing the mold release force required for removing a molded thermoplastic acrylonitrile-butadiene-styrene resin composition from a mold, comprising:

blending into a thermoplastic acrylonitrile-butadiene-styrene resin a mold release force reduction effective amount of a mold release agent ester selected from a group consisting of cetyl palmitate, cetyl stearate and blends of cetyl palmitate and cetyl stearate in order to form a resin blend composition;

inserting the resin blend composition into a mold and molding the resin blend composition into a shaped product; and releasing the shaped product from the mold by applying a mold release force that is less than that required for a shaped product identically molded from an acrylonitrile-butadiene-styrene resin molding composition that was molded in the absence of said mold release agent ester.

13. The method according to claim 12, wherein said mold release force is at least about 10 percent less than said force needed for molding in the absence of said mold release agent ester.

14. The method according to claim 12, wherein said blending step excludes the addition of free carboxylic acid to the resin blend composition.

15. The method according to claim 12, wherein the mold release force reduction amount of said blending step is between about 0.1 and about 2 weight percent of the resin blend composition.

16. The method according to claim 12, wherein the mold release force reduction amount of said blending step is between about 0.4 and about 1.5 weight percent of the resin blend composition.

17. The method according to claim 12, wherein the mold release force reduction amount of said blending step is between about 0.5 and about 1.2 weight percent of the resin blend composition.

18. The method according to claim 12, wherein said molding step is an injection molding step.

* * * * *